United States Patent
Folds et al.

(10) Patent No.: US 11,344,822 B2
(45) Date of Patent: May 31, 2022

(54) NANOGAS SHEAR PROCESSING

(71) Applicant: Nano Gas Technologies Inc., Deerfield, IL (US)

(72) Inventors: Rudy M Folds, Abilene, TX (US); Scott A Fiedler, Palatine, IL (US); Jeffrey K Hardin, Wilmette, IL (US)

(73) Assignee: NANO GAS TECHNOLOGIES INC., Deerfield, IL (US)

( * ) Notice: Subject to any disclaimer, the term of this patent is extended or adjusted under 35 U.S.C. 154(b) by 95 days.

(21) Appl. No.: 16/070,940

(22) PCT Filed: Apr. 26, 2018

(86) PCT No.: PCT/US2018/029574
§ 371 (c)(1),
(2) Date: Jul. 18, 2018

(87) PCT Pub. No.: WO2018/200815
PCT Pub. Date: Nov. 1, 2018

(65) Prior Publication Data
US 2021/0046401 A1    Feb. 18, 2021

Related U.S. Application Data

(60) Provisional application No. 62/491,596, filed on Apr. 28, 2017.

(51) Int. Cl.
*C02F 1/24*        (2006.01)
*B01D 17/02*       (2006.01)
(Continued)

(52) U.S. Cl.
CPC ........ *B01D 17/0205* (2013.01); *B01F 23/232* (2022.01); *B01F 25/31243* (2022.01);
(Continued)

(58) Field of Classification Search
CPC ....... C02F 1/24; B01D 17/0205; B03D 1/247; B03D 2203/006
(Continued)

(56) References Cited

U.S. PATENT DOCUMENTS 2,730,190 A * 1/1956 Brown ................... C10G 33/06
                                                                95/253
3,243,046 A * 3/1966 Kakumoto ........... B03D 1/1456
                                                                210/199
(Continued)

FOREIGN PATENT DOCUMENTS

DE      2938264 A1 * 10/1980
JP    2008086860 A *  4/2008
(Continued)

OTHER PUBLICATIONS

ISR/WO for PCT/US2018/029574, dated Jul. 6, 2018.

*Primary Examiner* — Thomas M Lithgow
(74) *Attorney, Agent, or Firm* — Gregory D. DeGrazia; Miller, Canfield Paddock & Stone PLC

(57) ABSTRACT

A process for separation of a slurry by radially injecting a stream of a nanogas solution at a shear-focus volume within a pipe; passing an aqueous slurry through the pipe along a direction of flow and through the shear-focus volume; and shearing and/or admixing the slurry with the nanogas solution within the shear-focus volume.

10 Claims, 4 Drawing Sheets

(51) Int. Cl.
*B03D 1/24* (2006.01)
*B01F 23/232* (2022.01)
*B01F 25/312* (2022.01)

(52) U.S. Cl.
CPC ................ *B03D 1/247* (2013.01); *C02F 1/24* (2013.01); *B03D 2203/006* (2013.01)

(58) Field of Classification Search
USPC ........................................................ 210/703
See application file for complete search history.

(56) References Cited

U.S. PATENT DOCUMENTS

| | | | | |
|---|---|---|---|---|
| 4,415,368 | A * | 11/1983 | Kroon | ..................... E01H 1/001 405/128.7 |
| 4,783,268 | A | 11/1988 | Leung | |
| 4,842,777 | A * | 6/1989 | Lamort | ................. B01F 5/0415 209/170 |
| 6,527,960 | B1 | 3/2003 | Bacon et al. | |
| 10,591,231 | B2 * | 3/2020 | Russell | .................... C02F 1/685 |
| 2005/0242000 | A1 * | 11/2005 | Khan | ..................... B03D 1/028 209/164 |
| 2008/0099396 | A1 * | 5/2008 | Rother | ................. C02F 1/5209 210/609 |
| 2010/0230325 | A1 | 9/2010 | Harris | |
| 2011/0114566 | A1 | 5/2011 | McCaw et al. | |
| 2014/0158631 | A1 * | 6/2014 | Govind | ................ B03D 1/1431 210/706 |
| 2014/0339143 | A1 | 11/2014 | Kerfoot | |
| 2016/0325247 | A1 | 11/2016 | Roe | |

FOREIGN PATENT DOCUMENTS

| | | | |
|---|---|---|---|
| WO | WO 2015/030381 | A1 * | 3/2015 |
| WO | WO 2015/137484 | A1 * | 9/2015 |

* cited by examiner

NANOGAS SHEAR PROCESSING

CROSS-REFERENCE TO RELATED APPLICATIONS

This disclosure claims the benefit of priority to PCT Application No. PCT/US2018/029574, filed 26 Apr. 2018 which claims priority to U.S. Application No. 62/491,596, filed 28 Apr. 2017, the disclosures of which are incorporated herein in their entirety.

FIELD OF THE INVENTION

The present invention provides a process for removing oil from particulate matter comprising mixing an aqueous slurry of the particulate matter with one or more streams of a nanogas solution.

BACKGROUND

Procedures for the separation of oil from water and other aqueous-based solutions are generally well known and often achieve very high degrees of separation. However, the removal of oil from particulate matter, either in the presence or absence of water, is much more difficult and current separation procedures generally result in levels of residual oil contamination that make disposal of the particulate matter difficult and/or hazardous.

Oil contaminated of particulate matter is common in the oil industry. Sand often becomes contaminated with crude oil at the well-head or on the production rig during oil extraction procedures. Additionally, solid materials settled out of crude oil generally are mixtures of sand, silt, and/or clay contaminated with 5 to 30 wt. % crude oil. Waste sludge contaminated with oil is also often produced during refinery operations.

Oil contaminated particulate matter is also a problem in many other industries. For example, in the manufacture of carbon steel the steel is often processed through a strip-mill, in which ingots of steal are rolled. In order to cool the mill, and help lubricate the process, oil and water are sprayed on to the steel, which leads to the production of oily mill scale (i.e., fine iron particles in the range of 5 to 1,000 microns coated in oil, at an oil concentration range of 0.2 to 30 wt. %). Similarly, oil contaminated glass is produced during the large scale manufacture of glass items. Hazardous railway ballast also contains significant levels of oil contamination, as does the waste extracted from oil interceptors that are used, for example, on garage forecourts.

Nearly all procedures for physically removing oil from particulate matter include a shearing process to strip the oil from the solid surface. One method employs the use of centrifuges, in which an oil, water, suspended solid mixture is spun and a oil and water phase is separated. This resulting water and oil phase is then further treated, either in a centrifuge or in a separate system. Chemicals are often used in this process to act as de-emulsifiers; however most such procedures normally result in residual oil levels of up to 15 wt. % in the solid phase.

Another method employs re-circulating hydrocyclones, in which contaminated solids are collected in an accumulator before being jet pumped into a cyclone, sometimes with the addition of secondary water. Such procedures are normally batch processes with the solids being recirculated 6 or 7 times through the cyclone. Under optimal conditions this procedure can achieve residual oil contamination levels of less than 3 wt. % in the solids.

Yet another method employs a Denver Attrition cell, in which oil contaminated solids are slurried with water before being sheared by the use of a very fast agitator impeller in a confined tank. A process for oil separation using a Denver attrition cell is disclosed in U.S. Pat. No. 5,047,083. This procedure can achieve residual oil contamination of less than 5 wt. % in the solids, but large amounts of energy are required to drive the impeller at sufficient speeds, and high equipment attrition rates, for example due to damage to the impeller, are normally encountered.

SUMMARY

A first embodiment is process that includes providing a pipe having a direction of flow from an upstream location to downstream location; carrying a slurry within the pipe in the direction of flow; the pipe carrying a plurality of spray nozzles each having an outlet orifice in fluid communication with the slurry in the pipe; each outlet orifice having a center line an angle of about 15° to about 85° to the direction of flow; where the center lines of at least two spray nozzles intersect within the pipe; injecting a nanogas solution into the pipe via the spray nozzles; and shearing and/or admixing the slurry with the nanogas solution thereby forming an admixture.

A second embodiment is a process that includes providing a pipe having a direction of flow from an upstream location to a downstream location; a nozzle having an outlet orifice in fluid communication with the pipe; injecting a nanogas solution into the pipe via the nozzle adjacent to the upstream location whereby the flow of the nanogas solution draws a slurry into the pipe wherein the nanogas solution and the slurry admix; and ejecting the admixture of the nanogas solution and the slurry from the pipe.

A third embodiment is, a process that includes providing a pipe having a direction of flow from an upstream location to a downstream location; a nozzle having an outlet orifice in fluid communication with the pipe; injecting a driving solution into the pipe via the nozzle adjacent to the upstream location whereby the flow of the driving solution draws a mixing solution into the pipe wherein the driving solution and the mixing solution admix, where the driving solution and the mixing solution are different and selected from a nanogas solution and a slurry; and injecting a nanogas solution into the pipe via the nozzle adjacent to the upstream location whereby the flow of the nanogas solution draws a slurry into the pipe wherein the nanogas solution and the slurry admix; and ejecting the an admixture of the nanogas solution and the slurry from the pipe.

A fourth embodiment is a process that includes radially focusing a plurality of gas streams at a mixing volume within a pipe; passing an aqueous solution, that comprises at least 95 wt. % water, along the pipe and through the mixing volume; admixing the gas and the aqueous solution within the mixing volume thereby providing a pressurized admixture of a gas and water; carrying the pressurized admixture to a nozzle; and converting the pressurized admixture to a nanogas solution via the nozzle.

A fifth embodiment is a separation system that includes a pipe having a flow direction; a plurality of spray nozzles radially affixed to the pipe each set at an angle of about 15° to about 85° to the direction of flow; wherein the spray nozzles are adapted to provide a nanogas solution from a pressurized admixture of a gas and water.

BRIEF DESCRIPTION OF THE FIGURES

For a more complete understanding of the disclosure, reference should be made to the following detailed description and accompanying drawing figures wherein.

Figure 1:
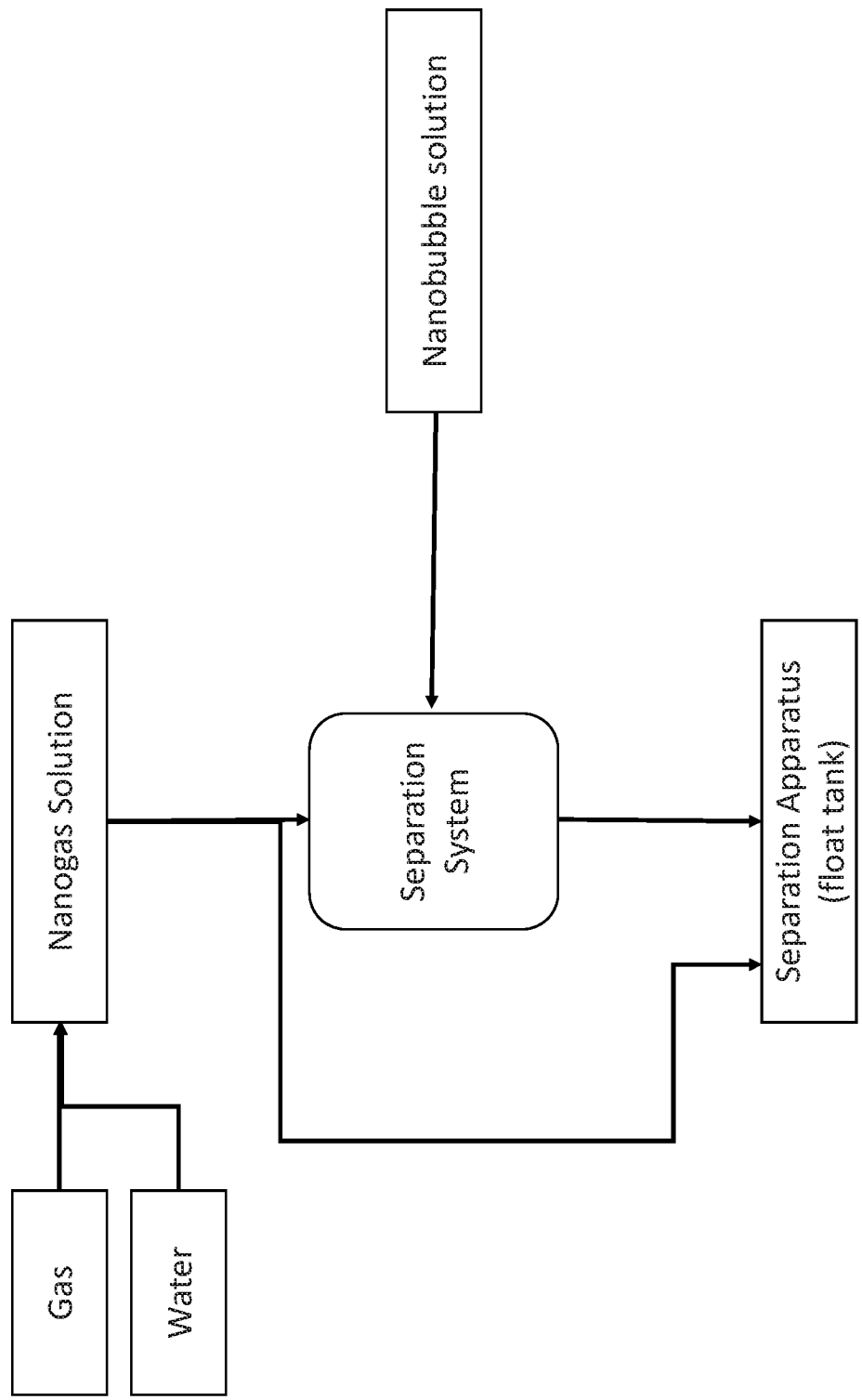
FIG. 1 is a schematic representation of one embodiment of the process described herein.

While specific embodiments are illustrated in the figures, with the understanding that the disclosure is intended to be illustrative, these embodiments are not intended to limit the invention described and illustrated herein.

DETAILED DESCRIPTION

Objects, features, and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

Herein, the use of the word "a" or "an" when used in conjunction with the term "comprising" in the claims and/or the specification may mean "one," but it is also consistent with the meaning of "one or more," "at least one," and "one or more than one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The herein disclosed process is useful for the separation of oil from water and/or solids, in one instance the process is useful for the separation of oil-in-water emulsions, in another instance the process is useful for the separation of solids from water (e.g., entrained solids, slurries, suspensions), in yet another instance the process is useful for the separation of oil from particulates in a water slurry. As used herein and unless specifically designated, the term slurry includes oil-in-water emulsions, solids suspended in water, and oily-solids suspended in water.

The disclosed separation process employs nanogas solution. As used herein, the nanogas solution is a homogeneous mixture of nanobubbles and water. The term "nanobubbles" means bubbles of a gas within a liquid, wherein the bubbles having an average diameter of about 10 nm to about 400 nm, about 10 nm to about 300 nm, about 10 nm to about 250 nm, about 10 nm to about 200 nm, about 10 nm to about 150 nm, or about 10 nm to about 100 nm. The herein utilized nanobubbles can be formed in or by a nanogas solution generator, one example of which is provided in U.S. Pat. No. 9,586,176 which is incorporated herein in its entirety.

The nanogas solution is preferably homogeneous, that is, the nanobubbles are evenly distributed throughout the solution and appear as a suspended "particulate" in the liquid. Notably, the liquid may further be saturated with or near saturation with the gas that comprises the nanobubbles. A mixture of bubbles and liquid wherein the bubbles coalesce and/or rise to the surface and break is not a homogeneous mixture of nanobubbles and the liquid.

The homogeneous mixture can include nanobubbles that include, consist essentially of, or consist of oxygen ($O_2$), nitrogen ($N_2$), carbon dioxide ($CO_2$), or a mixture thereof; and can include a liquid that is water, for example, distilled water, di-water, ground water, municipal water, collected water, or recycled water. As used herein, the terms oxygen and nitrogen refer to the gasses $O_2$ and $N_2$ whether or not the term oxygen gas or nitrogen gas is used.

In yet another instance, the homogeneous mixture (i.e., the nanogas solution) includes oxygen, nitrogen, carbon dioxide, or a mixture thereof. In one example, the nanogas solution is a nitrogen-nanogas solution wherein the solution includes, consists essentially of, or consists of nitrogen ($N_2$) and the water. Herein, the term consists essentially of refers to the inclusion of salts, gases, or solutes that may occur in the water (liquid) but have no effect on the performance of the nanogas solution in the herein disclosed processes. Notably, unless rigorously cleaned and degassed, water will always include some concentration of contaminants (solutes and gases). Herewith, the nanogas solution preferably consists essentially of the gas and water, wherein the contaminants in the water do not affect the performance of the solution. In another example, the nanogas solution is an oxygen-nanogas solution wherein the solution includes, consists essentially of, or consists of oxygen and water. In still another example, the nanogas solution is a ON-nanogas solution wherein the solution includes, consists essentially of, or consists of oxygen, nitrogen, and water. Herein, an ON-nanogas includes molar ratios of oxygen to nitrogen of 99:1 to 1:99, for example 99:1, 90:1, 80:1, 70:1, 60:1, 50:1, 40:1, 30:1, 20:1, 10:1, 1:1, 1:10, 1:20, 1:30, 1:40, 1:50, 1:60, 1:70, 1:80, 1:90, and 1:99. Preferred molar ratios include about 18:82, 21:79, 28:72, 30:70, 32:68, 35:65, 40:60, 42:58, and 50:50. Other particularly relevant molar ratios can be selected from 50:50; 60:40; 70:30; and 80:20.

In general, there is no limit to the amount of oil that may be removed from particulate matter by the process of the present invention, however it is particularly convenient for treating particulate matter comprising from 0.1 to 40 wt. %, preferably from 0.2 to 30 wt. % oil.

The process of the present invention is suitable for removing all types of oils from particulate matter, particularly fuel oil, diesel and heavy and light crude, as well as lighter oils such as edible oils or cutting oils.

Preferably, the oil contaminated particulate matter is in the form of an aqueous slurry before mixing with the one or more streams of the nanogas solution. Depending upon the source of the particulate matter, it may already be in the form of a slurry. If it is not in the form of an aqueous slurry, or if further water is required, the oil contaminated particulate matter may be slurrified with water using any conventional techniques and equipment, for example a cutting pump or a tank plus agitator. For the process of the present invention it is preferred that the aqueous slurry comprises 3 to 35% by volume particulate matter, more preferably 5 to 30% by volume, even more preferably 10 to 25% by volume, for example 18 to 25% by volume.

On mixing of the aqueous slurry of the oil contaminated particulate matter with the one or more injection streams comprised of the nanogas solution, the oil is removed from the surface and/or interstitial pores of the particulate matter principally by attrition and is deposited in the aqueous phase. The particulate matter may then be separated from the aqueous phase using any conventional procedures. Examples of procedures for separation of the particulate matter and the aqueous phase include gravimetric separation in a modified density separator (for example a Trident De-waterer) or a spiral classifier, or by use of a hydrocyclone. Optionally the particulate matter may be further rinsed with water to remove any residual oil contamination depending upon the final limit required.

Following separation, the aqueous phase may be passed to an oil-water separator where the oil is recovered, and the water may be further treated to remove residual oil contamination. Conventional procedures may be used for the oil-water separation and further treatment of the water. An example of further treatment of the water following conventional oil separation is the use of a polishing system, comprising a de-silter cyclone bank, and the passage of the water through absorption media chosen to remove dissolved and emulsified oils (e.g., clay absorbents or walnut shell media).

After removal of the oil, the water may be recycled for use in slurrying further oil contaminated particulate matter, or may be safely discharged to the environment.

After separation of the aqueous phase from the particulate matter, the particulate matter will preferably comprise less than 10,000 ppm by weight of oil, more preferably 1,000 ppm by weight or less, most preferably 200 ppm by weight or less.

In one instance, the one or more streams of the nanogas solution are applied to the aqueous slurry of the particulate matter at pressures of from 0.5 to 100 MPa, 0.5 to 75 MPa, 0.5 to 60 MPa, 0.5 to 50 MPa, 0.5 to 40 MPa, 0.5 to 30 MPa, 0.5 to 20 MPa, 0.5 to 10 MPa, or 0.5 to 5 MPa.

In one example, the nanogas solution is preferably mixed with the aqueous slurry of the particulate matter in the form of 3 to 18, 4 to 18, 5 to 18, or 6 to 18 streams, for example 12 streams. The high pressure streams are preferably applied to the aqueous slurry through nozzles having a total spraying surface area of from 0.2 to 10 $mm^2$, 0.2 to 8 $mm^2$, 0.2 to 6 $mm^2$, 0.2 to 4 $mm^2$, 1 to 8 $mm^2$, 2 to 8 $mm^2$, 3 to 8 $mm^2$, 4 to 8 $mm^2$, or 6 to 8 $mm^2$.

Preferably, the one or more streams of the nanogas solution are mixed with the aqueous slurry of particulate matter as the aqueous slurry is passed through a pipe. Suitable pipes will have diameters of from 100 to 250 mm, depending upon the volume of slurry that is to be treated and the average particle size of the oil contaminated particles. Typical tube internal diameters are 100, 150 and 250 mm. Pipes for use in the present invention may be made of any suitable materials, as long as they are strong enough to contain the pressures involved in the process and to resist abrasion caused by the mixing of the nanogas solution streams and aqueous slurry of the particulate matter. Suitable materials include steel, or Duplex steel if the slurry comprises saline water. Any thickness of pipe may be used, for example from 3 mm to 35 mm.

In another example, the aqueous slurry of particulate matter can be conveyed to the location at which it is mixed with the one or more nanogas solution streams by pumping, or by gravity feed (e.g., when the oil contaminated particulate matter is railway ballast).

Flow rates of the aqueous slurry of particulate matter through pipes can be from 5 to 75 to 200 $m^3$ per hour. In one instance, where the pipe for use in the present invention has a diameter of 100 mm, a preferred flow rate can be 100 to 120 $m^3$ per hour for diameters of 150 mm, a preferred flow rate can be 120 to 150 $m^3$ per hour, and for diameters of 250 mm, a preferred flow rate can be from 100 to 160 $m^3$ per hour.

When the present invention is carried out by mixing the one or more nanogas solution streams with the aqueous slurry of particulate matter in a pipe, the one or more nanogas solution streams are preferably projected into the pipe in the direction of flow of the aqueous slurry and at an angle of 15° to 85°, more preferably 22 to 40 degrees to the axis of the pipe, even more preferably at an angle of from 25 to 35 degrees to the axis of the pipe, for example at 30 degrees to the axis of the pipe. Alternatively, each of the one or more nanogas solution streams may be projected into the pipe in the direction of flow of the aqueous slurry through nozzles having three separate sub-nozzles, the central sub-nozzle projecting a stream at an angle of from 22 to 40 degrees (more preferably 25 to 35 degrees, for example 30 degrees) to the axis of the pipe; and the other two nozzles projecting streams at an angle of from 5 to 15 degrees and from 45 to 60 degrees (for example, 10 degrees and 50 degrees) to the axis of the pipe respectively. In a preferred example, the one or more nanogas solution streams are each projected into the pipe in the direction of flow of the aqueous slurry as 3 separate sub-streams at angles of 10, 30 and 50 degrees to the axis of the pipe respectively.

In another instance, the one or more nanogas solutions streams can be projected into the pipe in a direction counter to the direction of flow. In this instance, nanogas solution streams can be projected into the pipe at an angle of −15° to −85°, more preferably −22° to −40° to the axis of the pipe, even more preferably at an angle of from −25° to −35° to the axis of the pipe, for example at −30° to the axis of the pipe. Importantly in this instance, the flow rate of the aqueous slurry of particulate matter in the pipe must be sufficiently high to overcome the back flow caused by the injection of the nanogas solution streams counter to the direction of flow.

Where more than one stream of nanogas solution is mixed with the aqueous slurry of particulate matter as it is passed through a pipe, the streams of nanogas solution are preferably all projected into the pipe from nozzles arranged concentrically around the perimeter of the pipe.

Herewith, the disclosures of U.S. Pat. Nos. 9,586,186; 9,527,046; 8,500,104 are incorporated herein for their description of the machines and the processes for the production of nanogas solutions. For example, the machines and processes for the production of a nanogas solution can include providing a pressurized admixture of a gas and liquid (e.g., by admixing the gas and the liquid in a pressure vessel or by any other standard gas saturation process) and then passing the pressurized admixture through a nanogas nozzle. The nanogas nozzle can include a tube, having an internal diameter of about 1 mm to about 50 mm, preferably about 1 mm to about 20 mm, and including a plurality of bent and straight sections; preferably an alternating series of bent and straight sections. In one example, the bent sections are adapted to provide turbulent or transitional flow, and the straight sections are adapted to provide laminar flow. In another instance, the bent sections are adapted to provide a bent section flow Reynolds number, the straight sections are adapted to provide a straight section flow Reynolds number, and where the bent section flow Reynolds number is at least 500 greater than the straight section flow Reynolds number. In another example, the flow path through adjoining straight (laminar) sections, about a bent section, undergoes a change of direction of at least 60°, preferably 90°, more preferably 180°. In another instance, the nanogas nozzle provides a pressure drop from an inlet to an outlet of at least 100 psi, preferably at least 250 psi, at least 500 psi, at least 750 psi, at least 1000 psi, or at least 1500 psi. Alternatively, the nanogas nozzle can include one or more "capillary" tubes having an internal diameter of about 0.01 mm to about 2 mm, preferably about 0.5 mm to about 2 mm. In one instance, the nanogas nozzle can include a plurality of tubes having a length of about 10 mm to about 40 mm, preferably about 15 mm to about 25 mm, more preferably about 20 mm, and a substantially consistent internal diameter of about 0.5 mm to about 1.5 mm, preferably about 0.6 mm to about 1 mm, or about 0.7 mm to about 0.9 mm, or about 0.8 mm. In one particular instance, the nanogas nozzle can include a plurality of tubes that are colinear (parallel) and/or bundled. In another instance, the nanogas nozzle can include a plurality of tubes that diverge from a connection point in a conical arrangement. In another example, the nanogas nozzle includes one or more sections that have a Reynolds number greater than about 2300 (turbulent flow sections), preferably a Reynolds number in a range of about 2500 to about 100000, more preferably in a range of about 2500 to about 50000, or about 2500 to about 10000.

One embodiment of separation includes shearing and/or admixing a slurry and/or emulsion with a nanogas solution thereby forming a separation admixture which preferable demulsifies and/or separates into its components (for example depicted in FIG. 1). One example is separating oil and a particulate by a process which includes shearing and/or admixing a slurry with a nanogas solution forming an admixture or a separation admixture which preferably demulsifies and separates by component (oil, water, solid).

The process can include providing a pipe having a direction of flow from an upstream location to downstream location and carrying a slurry within the pipe in the direction of flow. The pipe can have an internal diameter (ID) of 25 mm to 1 m, preferably an ID of about 50 mm to 500 mm, about 50 mm to 250 mm. Notably, the ID of the pipe is preferably small enough that injected nanogas solution streams intersect in the pipe while the pipe is carrying the slurry. In one instance, the pipe preferably carries a plurality of spray nozzles each having an outlet orifice in fluid communication with the slurry in the pipe. Each outlet orifice has a center line angle of about 15° to about 85° to the direction of flow, herein a positive centerline angle from 0° to 90° indicates that flow from the spray nozzle is congruent with the direction of flow, a 90° center line angle is perpendicular to the direction of flow, and a negative centerline angle from 0° to 90° or an angle from 90° to 180° are against flow.

Preferably, the center lines of at least two spray nozzles intersect within the pipe. In one instance, the center lines of at least three spray nozzles intersect within the pipe. In another instance, the spray nozzles can be identified as a first plurality of spray nozzles and a second plurality of plurality of spray nozzles, the distinctions can be, for example, geometric positions, center line angles, positions along the direction of flow, and/or injection pressure. In one example, the center lines of the first plurality intersect and the centerlines of the second plurality intersect. In another example, the centerlines of the first plurality of spray nozzles and the second plurality of spray nozzles intersect. In yet another instance, the centerlines of radially positioned spray nozzles do not intersect but are projected about a core volume (e.g., a core volume that has a radius that is about 10%, 15%, 20%, 25%, 30%, 35%, 40%, 45%, or 50% of the radius of the pipe) along the direction of flow, for example a plurality of spray nozzles each having a centerline angle of about 22° can further include an angle of deflection from a pipe longitudinal axis (that runs along the direction of flow), in one instance, the angle of deflection can be about 22° thereby the plurality of spray nozzles provide a helical flow about the pipe's longitudinal axis. Preferably, the angle of deflection is in a range from about 0° to about 40°, about 5° to about 30°, or about 5° to about 25°.

Notably, each outlet orifice has a center line angle of about 15° to about 85° to the direction of flow. Preferably, a plurality of outlet orifices have the individual center lines at an angle of about 15° to about 45°, more preferably about 20° to about 40°.

The process further includes injecting a nanogas solution into the pipe via the spray nozzles. Preferably, the nanogas solution is selected from a nitrogen-nanogas solution, an oxygen-nanogas solution, and an ON-nanogas solution. In one preferable instance, the nanogas solution is a nitrogen-nanogas solution. In another preferable instance, the nanogas solution is an oxygen-nanogas solution. In still another preferable instance, a nitrogen-nanogas solution is injected into the pipe and an oxygen-nanogas or a ON-nanogas solution is injected into the pipe, preferably at different locations along the direction of flow.

Yet further, the process can include providing the nanogas solution by converting a pressurized admixture of a gas and water into the nanogas solution. In one example, the process includes conveying a pressurized admixture of a gas and water to the spray nozzle and then converting the pressurized admixture to the nanogas solution via the spray nozzle.

The process further includes shearing and/or admixing the slurry with the nanogas solution thereby forming an admixture. The shearing/admixing of the nanogas solution with the slurry occurs, in part, due to the injection of the nanogas solution into the pipe (and slurry) at a pressure sufficient to entice shear. In one example, the nanogas solution is injected at an injection pressure of about 50 to about 1500 psi, about 50 to about 1200 psi, about 50 to about 1000 psi, about 100 to about 500 psi, or about 150 to about 300 psi.

Unexpectedly, the process affords the separation of oils from solids and/or emulsions with very low injection pressures. Notably, prior examples of shear inducing separation of oil from particulates in slurries utilized extremely high injection pressures to "tear" the oil from the particulate and, hopefully, allow the oil to separate or become emulsified with the water. In one instance of the instant process, the nanobubbles carried in the nanogas solution are dissolved into the oil carried on the particulates or carried in the emulsion, lighten the oil (reducing the density and/or the viscosity of the oil), and affect the separation of the oil from particulates and water. In another instance of the instant process, the shearing of the nanogas solution into the oil provides both a physical separation of oil from a particulate but also affords a physiochemical change to the oil, thereby providing unexpectedly superior separation. Notably, when the oil is contained in an oil-in-water emulsion (e.g., without particulates) traditional shearing processes would cause the oil to break into smaller and smaller droplets, thereby making separation more difficult. Here, unexpectedly, the shearing and/or admixing of the nanogas solution with an oil-in-water emulsion afforded the rapid separation of a "lightened" oil phase (an oil phase that included nanobubbles) from the mixture.

Following the injection of the nanogas solution and the formation of an admixture (the original slurry plus the nanogas solution), the slurry preferably separates and provides the base components (oil, water, and solids). In one instance, the process further includes conducting the admixture to a separation apparatus and separating hydrocarbons and water from the admixture. In one example, the separation apparatus can be a float tank, a cyclone separator, or even a storage system for the slurry before it is added into the pipe. In the latter example, wherein the separation apparatus is the storage system for the slurry, the storage system of the slurry can be a tar sands pond, a settling pond, or a separation tank, wherein the slurry is circulated from the storage system into the pipe and the admixture is ejected back into the storage system. Such a cyclical process can facilitate the separation of oils, solids, and water in static systems like the Canadian tar sands ponds.

Another embodiment is a process that can include providing a pipe having a direction of flow from an upstream location to a downstream location; a nozzle having an outlet orifice in fluid communication with the pipe; injecting a nanogas solution into the pipe via the nozzle adjacent to the upstream location whereby the flow of the nanogas solution draws a slurry into the pipe wherein the nanogas solution and the slurry admix; and ejecting the admixture of the nanogas solution and the slurry from the pipe.

In one instance this embodiment utilizes a nozzle and a pipe in a venture configuration. In another instance this embodiment utilizes a nozzle and a pipe in an aspirator configuration. In still another instance, the outlet orifice has a center line that is colinear with the direction of flow (e.g., a jet pump configuration). In one example of the colinear direction of flow, the nanogas solution can be injected via a plurality of nozzles each having an outlet orifice with a centerline, wherein the centerlines of the plurality of nozzles are parallel, and wherein the centerlines are colinear with the direction of flow. In still yet another instance, the nozzle forms a conical curtain of the nanogas solution in the pipe.

Notably, the process can further include providing the nanogas solution by conveying a pressurized admixture of a gas and water to the nozzle, and converting the pressurized admixture to the nanogas solution via the nozzle.

Still another embodiment is a process that can include radially focusing a plurality of gas streams at a mixing volume within a pipe; passing an aqueous solution, that comprises at least 95 wt. % water, along the pipe and through the mixing volume; admixing the gas and the aqueous solution within the mixing volume thereby providing a pressurized admixture of a gas and water; carrying the pressurized admixture to a nozzle; and converting the pressurized admixture to a nanogas solution via the nozzle.

Yet still another embodiment is a process that can include admixing a nanogas solution by any one of the herein described methods with a slurry that contains a reactive particulate. Herein, a reactive particulate includes but is not limited to those solids that undergo a chemical reaction with the gas carried as nanobubbles in the nanogas solution. In one instance, the solid can be a sulfide (e.g., an iron sulfide like pyrite, chalcopyrite; a copper sulfide; a molybdenum sulfide; or another sulfide mineral) and the gas can be oxygen. In this instance, the oxygen in the nanobubbles can react with and oxidize the sulfide. In an instance where the solid is a sulfide mineral carrying oil, the gas can be a mixture of oxygen and nitrogen, wherein the process separates the oil from the solid (preferably, by dissolving the nitrogen nanobubbles into the oil) and oxidizes the sulfide.

Figure 2:
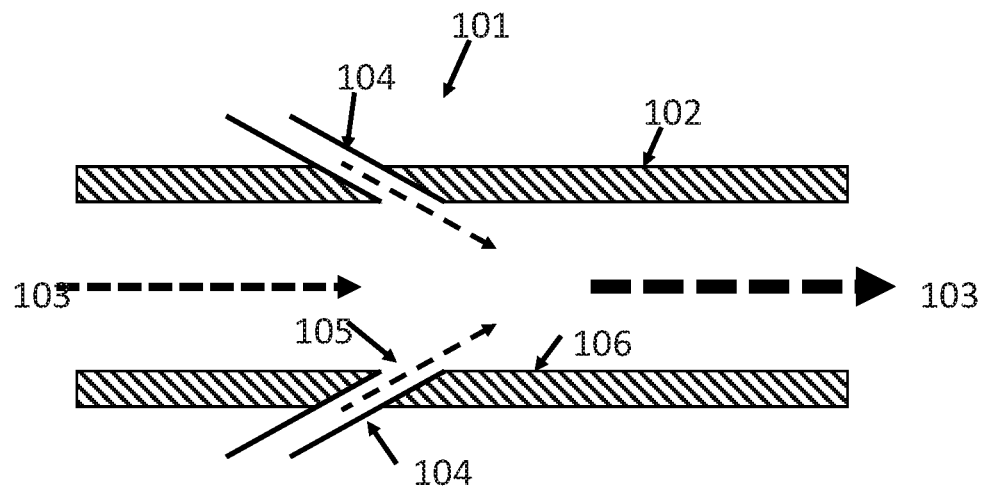
FIG. 2 is a drawing of a system for affecting the processes described here with the spray nozzle positioned in a cooperative flow (with the direction of flow in the pipe) orientation.
Figure 3:
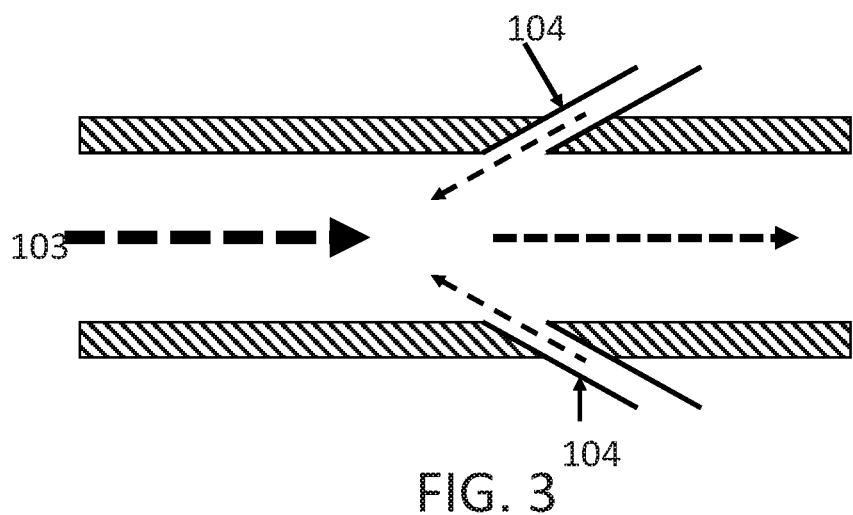
FIG. 3 is a drawing of a system for affecting the processes described here with the spray nozzle positioned in a counter flow (with the direction of flow in the pipe) orientation.

Still yet another embodiment is a separation system. In one instance shown in FIG. 2, the separation system 101 includes a pipe 102 having a flow direction 103 and a plurality of spray nozzles 104 radially affixed to the pipe. Each spray nozzle 104 can be set at an angle of about 15° to about 85°, about 20° to about 50°, or about 20° to about 40° to the direction of flow 103. In another instance shown in FIG. 3, each spray nozzle 104 is set at an angle of about −15° to about −85°, about −20° to about −50°, or about −20° to about −40° to the direction of flow 103. Preferably, the spray nozzles 104 are adapted to provide a nanogas solution from a pressurized admixture of a gas and water. In one instance, the spray nozzle is a nanogas nozzle, for example a capillary nozzle or a nozzle comprising a plurality of alternating radially bent and straight sections (for example as described in U.S. Pat. No. 9,586,186).

Figure 4:
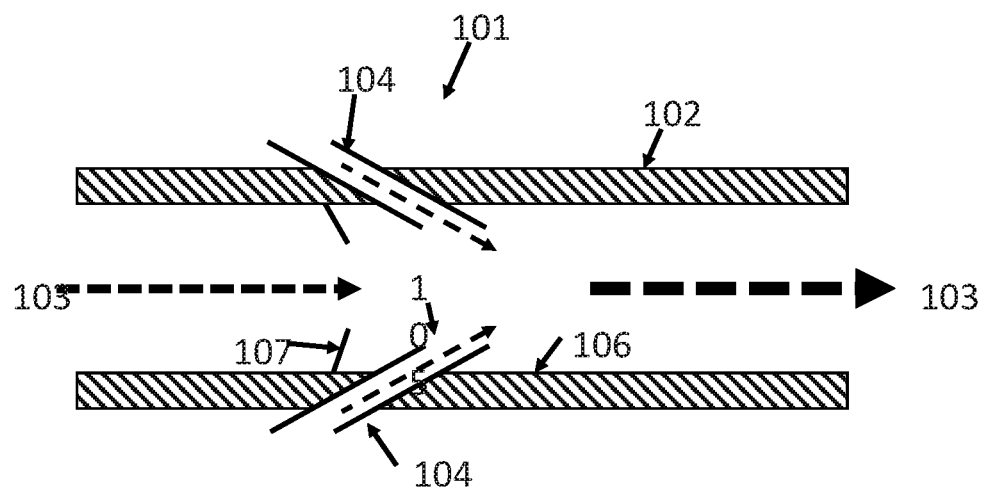
FIG. 4 is a drawing of a system for affecting the processes described here with the spray nozzle positioned in a cooperative flow orientation and including baffles that may protect the spray nozzles from abrasion and wear.

The spray nozzle 104 can have an outlet orifice 105 that is flush with an internal surface 106 of the pipe 102. Alternatively, as shown in FIG. 4, the spray nozzle 104 can have an outlet orifice 105 that stands off of the internal surface 106 of the pipe 102, wherein the outlet orifice is carried by a length of the spray nozzle which extends through a side wall of the pipe and terminates (at the outlet orifice) within the lumen of the pipe. Still further, the pipe can include a baffle 107 upstream of the outlet orifice, preferably wherein the baffle 107 is adapted to protect the outlet orifice from abrasion and/or is adapted to increase turbulent flow about the outlet orifice. Yet still further, the pipe can carry baffles downstream of the outlet orifice (not shown), where these downstream baffles are adapted to increase turbulent flow in the pipe. For example, the downstream baffles may be positions to create a counter current flow or counter rotation within the pipe.

Figure 5:
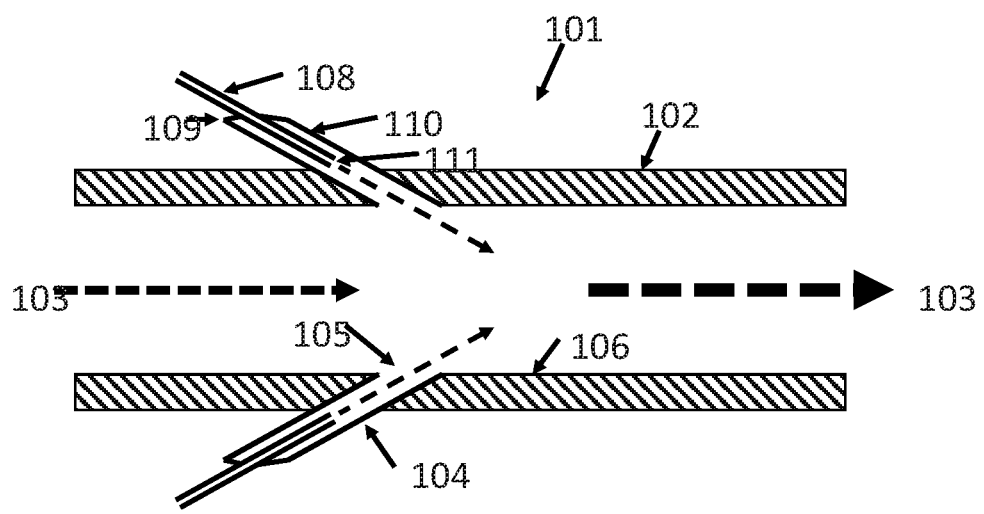
FIG. 5 is a drawing of a system for affecting the processes described here with the spray nozzle positioned in a cooperative flow (with the direction of flow in the pipe) orientation where a nanogas delivery tube terminates within the spray nozzle.

As shown in FIG. 5, the system can include a spray nozzle 104 wherein the nanogas solution is provided via a delivery tube 109 that terminated 111 within the spray nozzle housing 110 or (not show) may extend into the pipe 102. Preferably, the delivery tube 109 is affixed at a connection point 109 to the spray nozzle housing 110. The delivery tube 109 can be affixed by welding, Swageloc-type fittings, or other methods. Preferably, the delivery tube 109 is a distal end of a nanogas forming nozzle, e.g., those shown in U.S. Pat. No. 9,586,186 and incorporated herein.

In still another instance, the separation system includes a pipe pump which is adapted to provide a flow through the pipe. The pipe pump can directly facilitate the flow through the pipe or can carry the solution (e.g., slurry) to a point where the solution can flow through the pipe as a function of gravity. The pipe pump is preferably upstream of the spray nozzles.

In yet another instance, the separation system includes a pressurization system that is adapted to provide a pressurized admixture of a gas and water. The pressurization system can include, for example, a tank, injection ports, and pumps necessary to provide, preferably, a saturated or supersaturated admixture of the gas in the water. In one example, the pressurization system provides the pressurized admixture of the gas and water at a pressure of about 100 psi to about 3000 psi, about 200 psi to about 2000 psi, or about 300 psi to about 1000 psi.

Figure 6:
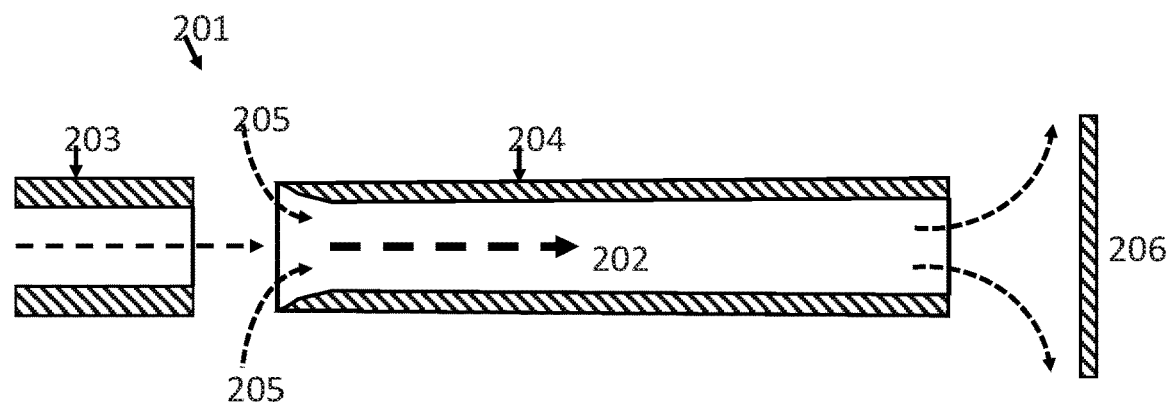
FIG. 6 is a drawing of a venturi type system for admixing a driving fluid with a second fluid and shows a mixing volume and weir or baffle.
Figure 7:
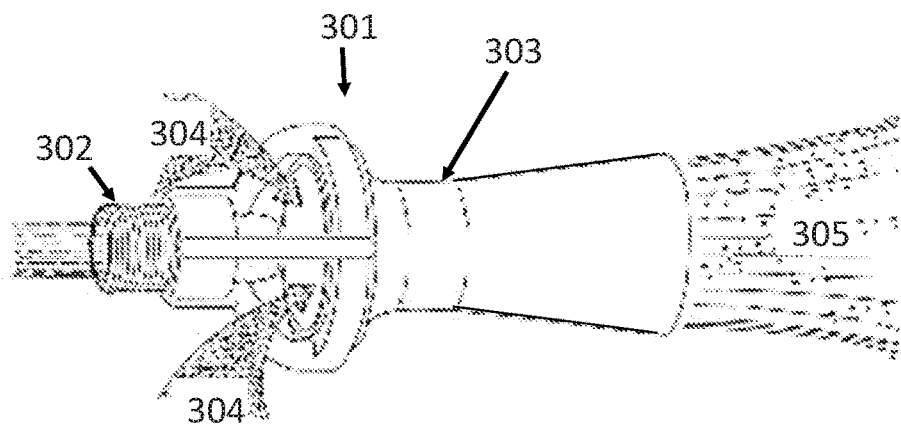
FIG. 7 is a drawing of an open venturi or jet nozzle showing the flow of the second fluid into the nozzle.
Figure 8:
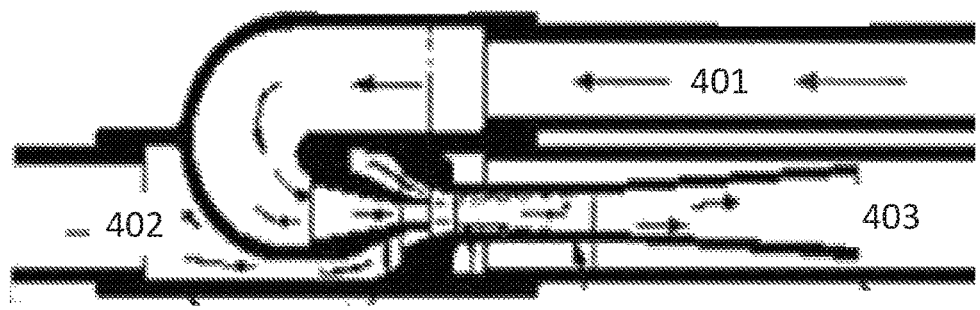
FIG. 8 is a drawing of an enclosed venturi type nozzle showing flow paths for both the motive (driving) fluid and the second fluid.

In still another instance, the separation system includes a pipe having a flow direction and one or more spray nozzles adapted and positioned to provide a nanogas solution to the pipe, see for example FIGS. 6-8. In one example shown in FIG. 6 (a second is show in FIG. 8), the spray nozzle(s) and the pipe are in an educator or venturi configuration with a motive nozzle 203, a body, and a discharge 204. Here, the nanogas solution can be provided via the motive nozzle 203 (driving nozzle) or through the suction 205 created in the body by the driving fluid. In the instance where the spray nozzle(s) singularly or in combination are the motive nozzle 203, the nanogas solution has a direction of flow along a longitudinal axis of the pipe. Additionally, the motive nozzle 203 can be a nanogas nozzle (as described above). In the instance where the motive nozzle 203 provides a slurry or emulsion (in line with the longitudinal axis of the pipe), the suction created in the body by the driving fluid (slurry or emulsion) draws in the nanogas solution (an aspirator configuration). In another example, the system includes an educator or venturi configuration where each spray nozzle is a motive nozzle in fluid connection with a pipe/discharge. The separation system can further include an ejection baffle or weir 206 that encourages denser materials to settle and less dense materials to rise. FIG. 8 displays arrows indicating the flow paths through a venture style nozzle where the flow 401 of the driving fluid draws in a flow 402 of a carried fluid where the admixture is ejected from the discharge as a flow 403.

In still another example, separation system can have a jet pump scrubber configuration, see for example FIG. 7. A jet pump scrubber 301 includes a jet pump nozzle 302 that is adapted to deliver a solution in a jet stream to a jet pump mixer 303. As the jet pump nozzle 302 delivers the jet stream a surrounding solution 304 is drawn into the jet pump mixer 303, the jet stream and the surrounding solution are sheared/admixed within the jet pump mixer 303 and then ejected 305. In this instance, the jet pump nozzle is preferably a nanogas nozzle, thereby providing a nanogas solution as the jet stream.

As used herein, the terms venture, educator, and jet pump all reference systems where a motive or driving fluid creates a suction, or induces a vacuum, and draws an inlet fluid into the flow path.

While the compositions and methods of this invention have been described in terms of preferred embodiments, it will be apparent to those of skill in the art that variations may be applied to the compositions and/or methods in the steps or in the sequence of steps of the method described herein without departing from the concept, spirit and scope of the invention. More specifically, it will be apparent that certain agents that are both chemically and physically related may be substituted for the agents described herein while the same or similar results would be achieved. All such similar substitutes and modifications apparent to those skilled in the art are deemed to be within the spirit, scope and concept of the invention as defined by the appended claims.

What is claimed:

1. A process comprising:

providing a pipe having a direction of flow from an upstream location to downstream location;

carrying a slurry within the pipe in the direction of flow; the pipe carrying a plurality of spray nozzles for generating a nanogas solution, each spray nozzle having an outlet orifice in fluid communication with the slurry in the pipe; each outlet orifice of the spray nozzles having a center line at an angle selected from about 15° to about 85° and from about −15° to about −85° to the direction of flow within the pipe;

providing a pressurized admixture of a gas and water to the spray nozzle, using the spray nozzle for converting the pressurized admixture to the nanogas solution, and injecting the nanogas solution into the pipe via the outlet orifices of the spray nozzles; and shearing and/or admixing the slurry with the nanogas solution thereby forming an admixture.

2. The process of claim 1, wherein the center lines of at least two spray nozzles intersect within the pipe.

3. The process of claim 2, wherein the center lines of at least three spray nozzles intersect within the pipe.

4. The process of claim 1, wherein each outlet orifice has a center line at an angle of about 15° to about 85° to the direction of flow.

5. The process of claim 4, wherein the angle is about 20° to about 40°.

6. The process of claim 1 further comprising conducting the admixture to a separation apparatus and separating hydrocarbons and water from the admixture.

7. The process of claim 1, wherein the nanogas solution is selected from a nitrogen-nanogas solution, an oxygen-nanogas solution, an ON-nanogas solution.

8. The process of claim 1, comprising a first plurality of spray nozzles and a second plurality of plurality of spray nozzles; wherein the center lines of the first plurality intersect and the center lines of the second plurality intersect.

9. The process of claim 8, wherein the center lines of the first plurality of spray nozzles intersect with the second plurality of spray nozzles.

10. The process of claim 1, wherein the nanogas solution is injected into the pipe at an injection pressure of about 100 to about 500 psi.

* * * * *